(12) United States Patent
Shi et al.

(10) Patent No.: US 10,645,106 B2
(45) Date of Patent: May 5, 2020

(54) METHOD, APPARATUS, AND SYSTEM FOR DETECTING TERMINAL DEVICE ANOMALY

(71) Applicant: HUAWEI TECHNOLOGIES CO., LTD., Shenzhen (CN)

(72) Inventors: Xiaoyan Shi, Shenzhen (CN); Qianghua Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 213 days.

(21) Appl. No.: 15/859,752

(22) Filed: Jan. 2, 2018

(65) Prior Publication Data
US 2018/0124087 A1 May 3, 2018

Related U.S. Application Data
(63) Continuation of application No. PCT/CN2015/083444, filed on Jul. 7, 2015.

(51) Int. Cl.
*H04L 29/06* (2006.01)
*H04W 12/12* (2009.01)
(Continued)

(52) U.S. Cl.
CPC ......... *H04L 63/1425* (2013.01); *H04W 12/12* (2013.01); *H04W 24/04* (2013.01);
(Continued)

(58) Field of Classification Search
CPC .. H04L 63/1425; H04W 24/08; H04W 12/12; H04W 88/16; H04W 12/06; H04W 24/04
(Continued)

(56) References Cited

U.S. PATENT DOCUMENTS 6,011,790 A * 1/2000 Fisher .................. H04W 28/06
370/349
8,868,030 B2 * 10/2014 Sumcad ................. H04W 4/48
455/405
(Continued)

FOREIGN PATENT DOCUMENTS

CN 102056128 A 5/2011
CN 102056140 A 5/2011
(Continued)

OTHER PUBLICATIONS

3GPP TS 23.203 V13.4.0 3rd Generation Partnership Project;Technical Specification Group Services and System Aspects;Policy and charging control architecture(Release 13), Technical Specification, Jun. 2015, 235 pages.

*Primary Examiner* — Taghi T Arani
*Assistant Examiner* — Badri Narayanan Champakesan
(74) *Attorney, Agent, or Firm* — Kilpatrick Townsend & Stockton LLP

(57) ABSTRACT

Embodiments of the present invention provide a method, an apparatus, and a system for detecting a terminal device anomaly. A PGW obtains abnormal event triggering information regarding a terminal device, and the abnormal event triggering information includes at least one of the following: an abnormal event condition for the terminal device or configuration information regarding an abnormal event trigger; and the PGW determines, according to the abnormal event triggering information, that an anomaly has occurred in the terminal device, so that when the terminal device has a behavior (for example, the terminal device carries out a service related behavior beyond a specified range or the terminal device is damaged and abnormal) that is indicated by the abnormal event triggering information, the PGW can detect the anomaly of the terminal device, and an adminis- (Continued)

trator of the terminal device can obtain anomaly information regarding the terminal device from the PGW node.

23 Claims, 7 Drawing Sheets

(51) Int. Cl.
    *H04W 24/04*     (2009.01)
    *H04W 24/08*     (2009.01)
    *H04W 12/06*     (2009.01)
    *H04W 88/16*     (2009.01)

(52) U.S. Cl.
    CPC ............ *H04W 24/08* (2013.01); *H04W 12/06* (2013.01); *H04W 88/16* (2013.01)

(58) Field of Classification Search
    USPC .......................................................... 726/23
    See application file for complete search history.

(56) References Cited

U.S. PATENT DOCUMENTS

| | | | | |
|---|---|---|---|---|
| 2006/0154647 | A1* | 7/2006 | Choi | H04W 12/1206 455/411 |
| 2010/0058442 | A1* | 3/2010 | Costa | H04L 63/20 726/3 |
| 2010/0322069 | A1* | 12/2010 | Song | H04W 28/24 370/229 |
| 2011/0138463 | A1* | 6/2011 | Kim | H04L 63/1425 726/22 |
| 2012/0094685 | A1* | 4/2012 | Marsico | H04W 4/021 455/456.1 |
| 2012/0220326 | A1* | 8/2012 | Li | H04W 8/22 455/509 |
| 2013/0305357 | A1* | 11/2013 | Ayyagari | H04W 12/06 726/22 |
| 2014/0031005 | A1* | 1/2014 | Sumcad | H04W 4/48 455/405 |
| 2014/0293824 | A1* | 10/2014 | Castro Castro | H04L 41/142 370/252 |
| 2015/0007314 | A1* | 1/2015 | Vaughan | H04L 63/1441 726/23 |
| 2015/0024737 | A1* | 1/2015 | Fox | H04L 41/5025 455/425 |
| 2015/0071085 | A1* | 3/2015 | Tsirinsky-Feigin | H04L 63/0236 370/242 |
| 2015/0257029 | A1 | 9/2015 | Li et al. | |
| 2015/0341379 | A1* | 11/2015 | Lefebvre | H04L 63/1425 726/22 |
| 2016/0119347 | A1* | 4/2016 | Liu | H04W 12/06 370/331 |

FOREIGN PATENT DOCUMENTS

| | | |
|---|---|---|
| CN | 102232301 A | 11/2011 |
| CN | 103716833 A | 4/2014 |
| CN | 104040947 A | 9/2014 |
| EP | 2574133 A1 | 3/2013 |
| EP | 2611234 A1 | 7/2013 |
| EP | 2835991 A1 | 2/2015 |
| RU | 2521550 C2 | 6/2014 |
| WO | 2011063559 A1 | 6/2011 |
| WO | 2013071958 A1 | 5/2013 |

* cited by examiner

US 10,645,106 B2

METHOD, APPARATUS, AND SYSTEM FOR DETECTING TERMINAL DEVICE ANOMALY

CROSS-REFERENCE TO RELATED APPLICATIONS

This application is a continuation of International Application No. PCT/CN2015/083444, filed on Jul. 7, 2015, which is hereby incorporated by reference in their entireties.

TECHNICAL FIELD

Embodiments of the present invention relate to communications technologies, and in particular, to a method, an apparatus, and a system for detecting a terminal device anomaly.

BACKGROUND

An evolved packet system (EPS) of the 3rd Generation Partnership Project (3GPP, 3rd Generation Partnership Project) includes an evolved universal terrestrial radio access network (E-UTRAN), a mobility management entity (MME), a serving gateway (SGW), a packet data network gateway (PGW), and a home subscriber server (HSS) (or a subscription profile repository (SPR)).

In the prior art, the E-UTRAN generally includes a terminal device and an evolved NodeB (eNodeB), and the terminal device accesses the EPS system by using the eNodeB. The terminal device may include user equipment (UE), a machine to machine (M2M) device, and the like. A user may perform a service, such as making a call and accessing the Internet, by using the UE and the EPS system. A user of the M2M device may perform a service such as intelligent measurement, remote monitoring, tracing, and medical treatment by using the M2M device and the EPS system. Theoretically, the terminal device may perform, by using the EPS system, all services that are supported by the EPS system. In the prior art, some anomalies may occur in the terminal device. For example, (1) the terminal device performs a service beyond a specified range (for example, a smoke sensor is configured to only exchange data with a fire detection center at a peer end of the EPS system, and should not perform a service such as downloading or accessing the Internet; or some specific UE is configured to only make a call, and cannot access the Internet), and (2) the M2M device is faulty and cannot normally work.

However, in the prior art, there is a problem that an administrator of the terminal device cannot obtain anomaly information regarding the terminal device.

SUMMARY

Embodiments of the present invention provide a method, an apparatus, and a system for detecting a terminal device anomaly.

According to a first aspect, an embodiment of the present invention provides a method for detecting a terminal device anomaly, including:

obtaining, by a packet data network gateway PGW, abnormal event triggering information indicating an abnormal event regarding a terminal device is triggered, where the abnormal event triggering information includes at least one of the following: an abnormal event triggering condition for the terminal device or configuration information regarding an abnormal event trigger; and determining, by the PGW according to the abnormal event triggering information, that an anomaly has occurred in the terminal device.

With reference to the first aspect, in a first possible implementation of the first aspect, the method further includes:

sending, by the PGW, anomaly information regarding the terminal device to a network node, where the network node is a policy and charging rules function PCRF node or an application function AF node.

With reference to the first possible implementation of the first aspect, in a second possible implementation of the first aspect, the sending, by the PGW, anomaly information regarding the terminal device to a network node includes:

receiving, by the PGW, an anomaly obtaining request sent by the network node; and sending, by the PGW, an anomaly obtaining response to the network node, where the anomaly obtaining response includes the anomaly information regarding the terminal device.

With reference to any one of the first aspect, or the first and the second possible implementations of the first aspect, in a third possible implementation of the first aspect, the obtaining, by a PGW, abnormal event triggering information indicating an abnormal event regarding a terminal device is triggered includes:

receiving, by the PGW, the abnormal event triggering information sent by the network node, where the network node is the PCRF node or the AF node.

With reference to the third possible implementation of the first aspect, in a fourth possible implementation of the first aspect, if the network node is the PCRF node, the receiving, by the PGW, the abnormal event triggering information sent by the network node includes:

receiving, by the PGW, a re-auth-request RAR message sent by the network node, where the RAR message includes the abnormal event triggering information; or receiving, by the PGW, a credit control answer CCA message sent by the network node, where the CCA message includes the abnormal event triggering information.

With reference to any one of the first aspect, or the first to the fourth possible implementations of the first aspect, in a fifth possible implementation of the first aspect, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

According to a second aspect, an embodiment of the present invention provides a method for detecting a terminal device anomaly, including:

obtaining, by a network node, abnormal event triggering information indicating an abnormal event regarding a terminal device is triggered, where the abnormal event triggering information includes at least one of the following: an abnormal event triggering condition for the terminal device or configuration information regarding an abnormal event trigger; and sending, by the network node, the abnormal event triggering information to a packet data network gateway PGW, where the abnormal event triggering information is used by the PGW to determine whether an anomaly has occurred in the terminal device.

With reference to the second aspect, in a first possible implementation of the second aspect, the network node is a policy and charging rules function PCRF node or an application function AF node.

With reference to the first possible implementation of the second aspect, in a second possible implementation of the second aspect, if the network node is the PCRF node, the obtaining, by a network node, abnormal event triggering information indicating an abnormal event regarding a terminal device is triggered includes:

receiving, by the network node, the abnormal event triggering information sent by the AF node; or receiving, by the network node, the abnormal event triggering information sent by a subscription profile repository SPR or a home subscriber server HSS.

With reference to the first possible implementation of the second aspect, in a third possible implementation of the second aspect, if the network node is the PCRF node, the sending, by the network node, the abnormal event triggering information to a PGW includes:

sending, by the network node, a re-auth-request RAR message to the PGW, where the RAR message includes the abnormal event triggering information; or sending, by the network node, a credit control answer CCA message to the PGW, where the CCA message includes the abnormal event triggering information.

With reference to any one of the second aspect, or the first to the third possible implementations of the second aspect, in a fourth possible implementation of the second aspect, the method further includes:

receiving, by the network node, anomaly information regarding the terminal device that is sent by the PGW.

With reference to the fourth possible implementation of the second aspect, in a fifth possible implementation of the second aspect, before the receiving, by the network node, anomaly information regarding the terminal device that is sent by the PGW, the method further includes:

sending, by the network node, an anomaly obtaining request to the PGW; and the receiving, by the network node, anomaly information regarding the terminal device that is sent by the PGW includes:

receiving, by the network node, an anomaly obtaining response sent by the PGW, where the anomaly obtaining response includes the anomaly information regarding the terminal device.

With reference to any one of the second aspect, or the first to the fifth possible implementations of the second aspect, in a sixth possible implementation of the second aspect, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

According to a third aspect, an embodiment of the present invention provides an apparatus for detecting a terminal device anomaly, where the apparatus is a packet data network gateway PGW, and the apparatus includes:

an obtaining module, configured to obtain abnormal event triggering information indicating an abnormal event regarding a terminal device is triggered, where the abnormal event triggering information includes at least one of the following: an abnormal event triggering condition for the terminal device or configuration information regarding an abnormal event trigger; and a determining module, configured to determine, according to the abnormal event triggering information, that an anomaly has occurred in the terminal device.

With reference to the third aspect, in a first possible implementation of the third aspect, the apparatus further includes:

a sending module, configured to send anomaly information regarding the terminal device to a network node, where the network node is a policy and charging rules function PCRF node or an application function AF node.

With reference to the first possible implementation of the third aspect, in a second possible implementation of the third aspect, the apparatus further includes:

a receiving module, configured to receive an anomaly obtaining request sent by the network node; and the sending module is specifically configured to send an anomaly obtaining response to the network node, where the anomaly obtaining response includes the anomaly information regarding the terminal device.

With reference to any one of the third aspect, or the first and the second possible implementations of the third aspect, in a third possible implementation of the third aspect, the obtaining module is specifically configured to receive the abnormal event triggering information sent by the network node, and the network node is the PCRF node or the AF node.

With reference to the third possible implementation of the third aspect, in a fourth possible implementation of the third aspect, if the network node is the PCRF node, the obtaining module is specifically configured to: receive a re-auth-request RAR message sent by the network node, where the RAR message includes the abnormal event triggering information; or receive a credit control answer CCA message sent by the network node, where the CCA message includes the abnormal event triggering information.

With reference to any one of the third aspect, or the first to the fourth possible implementations of the third aspect, in a fifth possible implementation of the third aspect, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

According to a fourth aspect, an embodiment of the present invention provides an apparatus for detecting a terminal device anomaly, where the apparatus is a network node, and the apparatus includes:

an obtaining module, configured to obtain abnormal event triggering information indicating an abnormal event regarding a terminal device is triggered, where the abnormal event triggering information includes at least one of the following: an abnormal event triggering condition for the terminal device or configuration information regarding an abnormal event trigger; and a sending module, configured to send the abnormal event triggering information to a packet data network gateway PGW, where the abnormal event triggering information is used by the PGW to determine whether an anomaly has occurred in the terminal device.

With reference to the fourth aspect, in a first possible implementation of the fourth aspect, the network node is a policy and charging rules function PCRF node or an application function AF node.

With reference to the first possible implementation of the fourth aspect, in a second possible implementation of the fourth aspect, if the network node is the PCRF node, the obtaining module is specifically configured to: receive the abnormal event triggering information sent by the AF node; or receive the abnormal event triggering information sent by a subscription profile repository SPR or a home subscriber server HSS.

With reference to the first possible implementation of the fourth aspect, in a third possible implementation of the fourth aspect, if the network node is the PCRF node, the obtaining module is specifically configured to: send a re-auth-request RAR message to the PGW, where the RAR message includes the abnormal event triggering information; or send a credit control answer CCA message to the PGW, where the CCA message includes the abnormal event triggering information.

With reference to any one of the fourth aspect, or the first to the third possible implementations of the fourth aspect, in a fourth possible implementation of the fourth aspect, the apparatus further includes a receiving module, configured to receive anomaly information regarding the terminal device that is sent by the PGW.

With reference to the fourth possible implementation of the fourth aspect, in a fifth possible implementation of the fourth aspect, the sending module is further configured to send an anomaly obtaining request to the PGW; and the receiving module is specifically configured to receive an anomaly obtaining response sent by the PGW, where the anomaly obtaining response includes the anomaly information regarding the terminal device.

With reference to any one of the fourth aspect, or the first to the fifth possible implementations of the fourth aspect, in a sixth possible implementation of the fourth aspect, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

According to a fifth aspect, an embodiment of the present invention provides a system for detecting a terminal device anomaly, including the packet data network gateway PGW according to any one of the third aspect or the first to the fifth possible implementations of the third aspect, and the network node according to any one of the fourth aspect or the first to the sixth possible implementations of the fourth aspect.

The present invention provides a method, an apparatus, and a system for detecting a terminal device anomaly. The PGW obtains the abnormal event triggering information of the terminal device, and the abnormal event triggering information includes at least one of the following: the abnormal event triggering condition or the configuration information regarding the abnormal event trigger; and the PGW determines, according to the abnormal event triggering information, that the anomaly has occurred in the terminal device, so that when the terminal device has a behavior (for example, the terminal device carries out a service related behavior beyond a specified range or the terminal device is damaged and abnormal) that is indicated by the abnormal event triggering information, the PGW can detect the anomaly of the terminal device, and an administrator of the terminal device can obtain the anomaly information regarding the terminal device from the PGW node.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
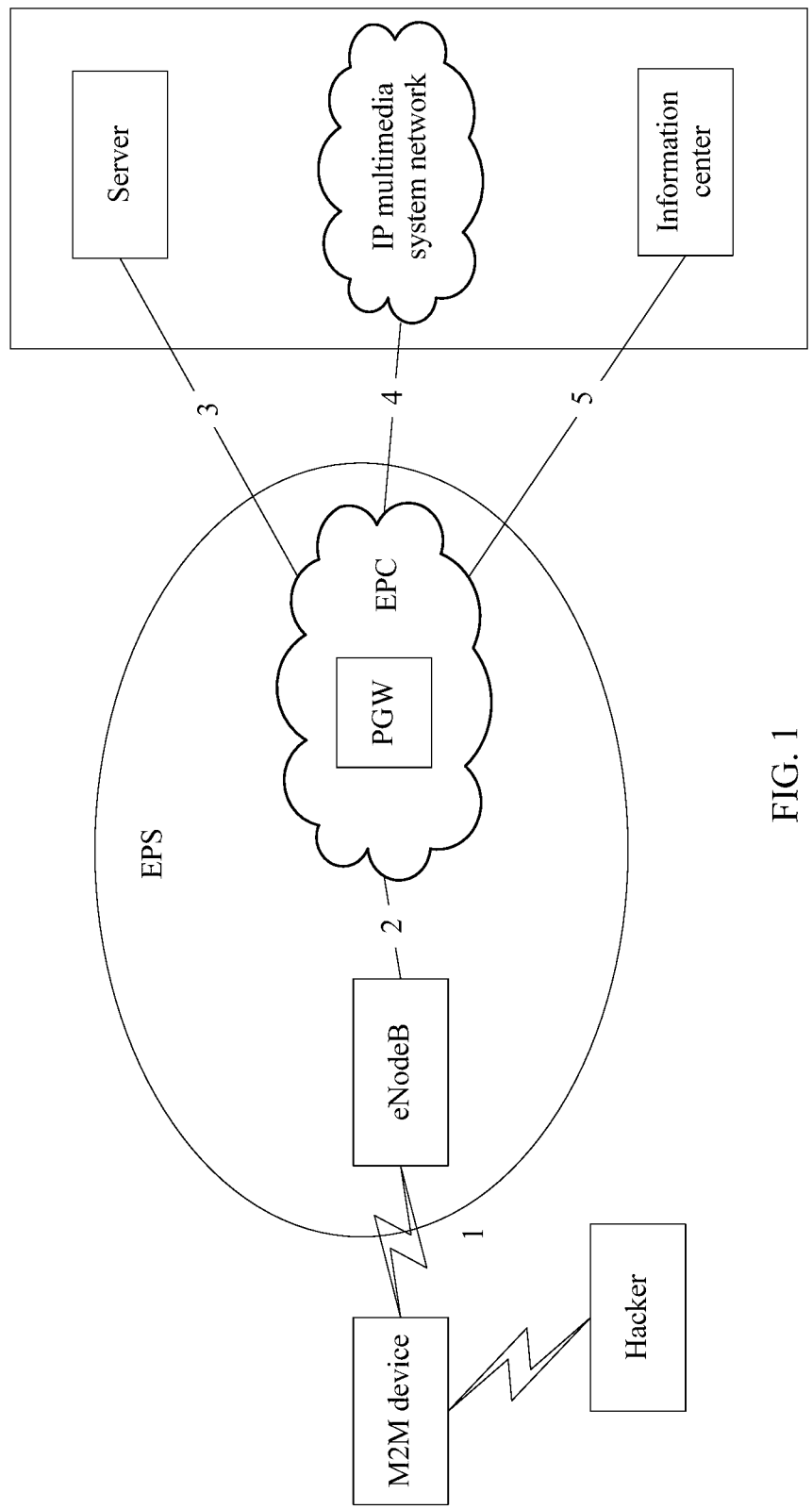
FIG. 1 is a schematic diagram of an application scenario of a method for detecting a terminal device anomaly according to the present invention.

FIG. 1 is a schematic diagram of an application scenario of a method for detecting a terminal device anomaly according to the present invention. The application scenario shown in FIG. 1 is a scenario in which an M2M device sends monitoring data to a server over an EPS network. As shown in FIG. 1, when the M2M device (such as a smoke sensor, a humidity sensor, a temperature sensor, a camera or a meter) normally works, anomaly data is transmitted on routes 1, 2, and 3. If the M2M device is damaged, a PGW does not receive, in a specified time range, the data that is transmitted by the M2M device. If an error occurs during running of the M2M device, the PGW receives incorrect data. If the M2M device is cracked by a hacker to perform another service, a route of the service flow deviates from an original normal route (for example, routes of a service flow for making a call are 1, 2, and 4, and routes of a service flow for accessing the Internet or downloading a file are 1, 2, and 5). An administrator of the terminal device may have a requirement for obtaining anomaly information regarding the terminal device and determining whether to replace or repair the terminal device that has an anomaly. However, in the prior art, there is a problem that the administrator of the terminal device cannot obtain the anomaly information regarding the terminal device.

It should be noted that for another terminal device, such as UE, that performs a service by using an EPS system, if the terminal device can perform only one or some specific processing, the foregoing problem generally exists.

Figure 2:
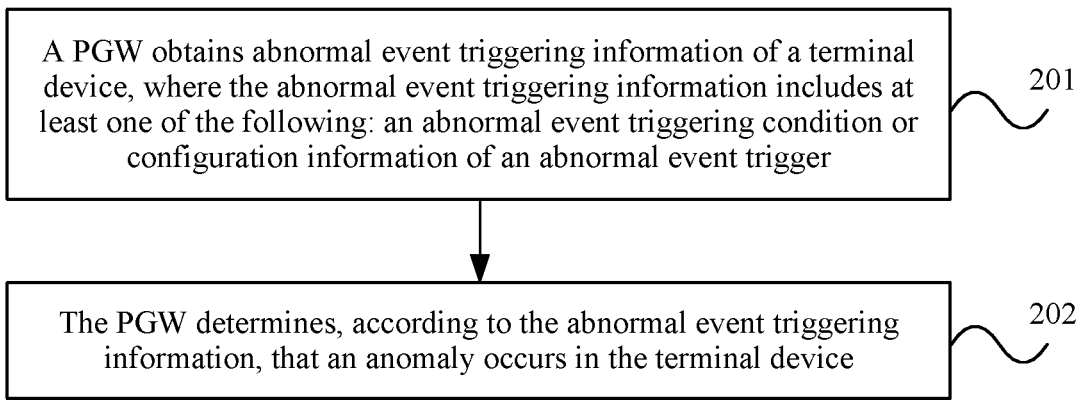
FIG. 2 is a flowchart of a first embodiment of a method for detecting a terminal device anomaly according to the present invention.

FIG. 2 is a flowchart of a first embodiment of a method for detecting a terminal device anomaly according to the present invention. As shown in FIG. 2, the method in this embodiment may include the following steps.

Step 201: A PGW obtains abnormal event triggering information indicating an abnormal event regarding a terminal device is triggered, where the abnormal event triggering information includes at least one of the following: an abnormal event triggering condition for the terminal device or configuration information regarding an abnormal event trigger.

In some embodiments, that the PGW obtains the abnormal event triggering information includes:

obtaining, by the PGW, the abnormal event triggering information from local configuration information of the PGW, where the local configuration information of the PGW includes the abnormal event triggering information; or receiving, by the PGW, the abnormal event triggering information sent by a network node.

The network node may be a policy and charging rules function (PCRF) node or an application function (AF) node.

Step 202: The PGW determines, according to the abnormal event triggering information, that an anomaly has occurred in the terminal device.

Optionally, that the PGW determines, according to the configuration information regarding the abnormal event trigger, that the anomaly has occurred in the terminal device may include:

installing, by the PGW, a corresponding abnormal event trigger according to the configuration information regarding the abnormal event trigger, and when the abnormal event trigger is triggered, determining that an anomaly corresponding to the configuration information regarding the abnormal event trigger is detected.

Optionally, that the PGW determines, according to the abnormal event triggering condition, that the anomaly has occurred in the terminal device may include:

determining, by the PGW according to the abnormal event triggering condition, whether the terminal device has a behavior that meets the abnormal event triggering condition; and if the terminal device has the behavior, determining that an anomaly corresponding to the abnormal event triggering condition is detected; or determining, by the PGW according to the abnormal event triggering condition, whether the terminal device has a behavior that meets the abnormal event triggering condition; and if the terminal device does not have the behavior, determining that an anomaly corresponding to the abnormal event triggering condition is detected.

In an existing network, some anomalies may occur in the terminal device. For example, (1) the terminal device performs a service beyond a specified range (for example, a smoke sensor is configured to only exchange data with a fire detection center at a peer end of the EPS system, and should not perform a service such as downloading or accessing the Internet; or some specific UE is configured to only make a call, and cannot access the Internet), and (2) the M2M device is faulty and cannot normally work. However, in the prior art, there is a problem that an administrator of the terminal device cannot obtain anomaly information regarding the terminal device.

In this embodiment of the present invention, the PGW obtains the abnormal event triggering information of the terminal device, and the abnormal event triggering information includes at least one of the following: the abnormal event triggering condition or the configuration information regarding the abnormal event trigger; and the PGW determines, according to the abnormal event triggering information, that the anomaly has occurred in the terminal device, so that when the terminal device has a behavior (for example, the terminal device carries out a service related behavior beyond the specified range or the terminal device is damaged and abnormal) that is indicated by the abnormal event triggering information, the PGW can detect the anomaly of the terminal device, and the administrator of the terminal device can obtain the anomaly information regarding the terminal device from the PGW node.

Figure 3:
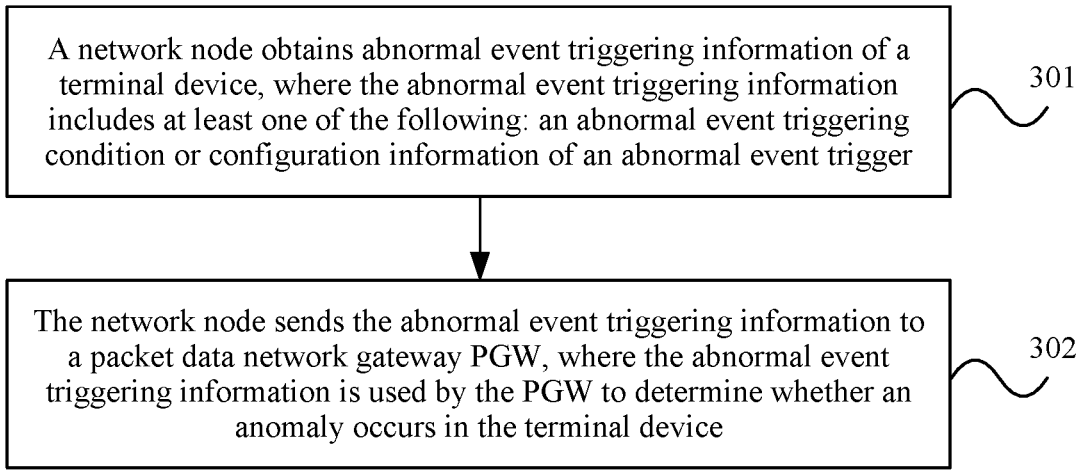
FIG. 3 is a flowchart of a second embodiment of a method for detecting a terminal device anomaly according to the present invention.

FIG. 3 is a flowchart of a second embodiment of a method for detecting a terminal device anomaly according to the present invention. As shown in FIG. 3, the method in this embodiment may include the following steps.

Step 301: A network node obtains abnormal event triggering information indicating an abnormal event regarding a terminal device is triggered, where the abnormal event triggering information includes at least one of the following: an abnormal event triggering condition for the terminal device or configuration information regarding an abnormal event trigger.

The network node may be a PCRF node, or an AF node.

Step 302: The network node sends the abnormal event triggering information to a packet data network gateway PGW, where the abnormal event triggering information is used by the PGW to determine whether an anomaly has occurred in the terminal device.

In this embodiment, the network node obtains the abnormal event triggering information regarding the terminal device, and the abnormal event triggering information includes at least one of the following: the abnormal event triggering condition or the configuration information regarding the abnormal event trigger; and the network node sends the abnormal event triggering information to the packet data network gateway PGW, and the abnormal event triggering information is used by the PGW to determine whether the anomaly has occurred in the terminal device, so that the PGW can determine an anomaly of the terminal device according to the abnormal event triggering information that is obtained from the network node.

Optionally, after step 202, the method may further include: sending, by the PGW, anomaly information regarding the terminal device to the network node.

Correspondingly, after step 302, the method may further include: receiving, by the network node, anomaly information regarding the terminal device that is sent by the PGW.

Optionally, before the receiving, by the network node, the anomaly information regarding the terminal device that is sent by the PGW, the method further includes:

sending, by the network node, an anomaly obtaining request to the PGW.

Correspondingly, the receiving, by the network node, anomaly information regarding the terminal device that is sent by the PGW includes: receiving, by the network node, an anomaly obtaining response sent by the PGW, where the anomaly obtaining response includes the anomaly information regarding the terminal device.

Optionally, the sending, by the PGW, anomaly information regarding the terminal device to the network node includes:

receiving, by the PGW, an anomaly obtaining request sent by the network node; and sending, by the PGW, an anomaly obtaining response to the network node, where the anomaly obtaining response includes the anomaly information regarding the terminal device.

It should be noted that the anomaly information regarding the terminal device is sent to the network node, so that an administrator of the terminal device can obtain the anomaly information regarding the terminal device from a network node except the PGW node.

Figure 4:
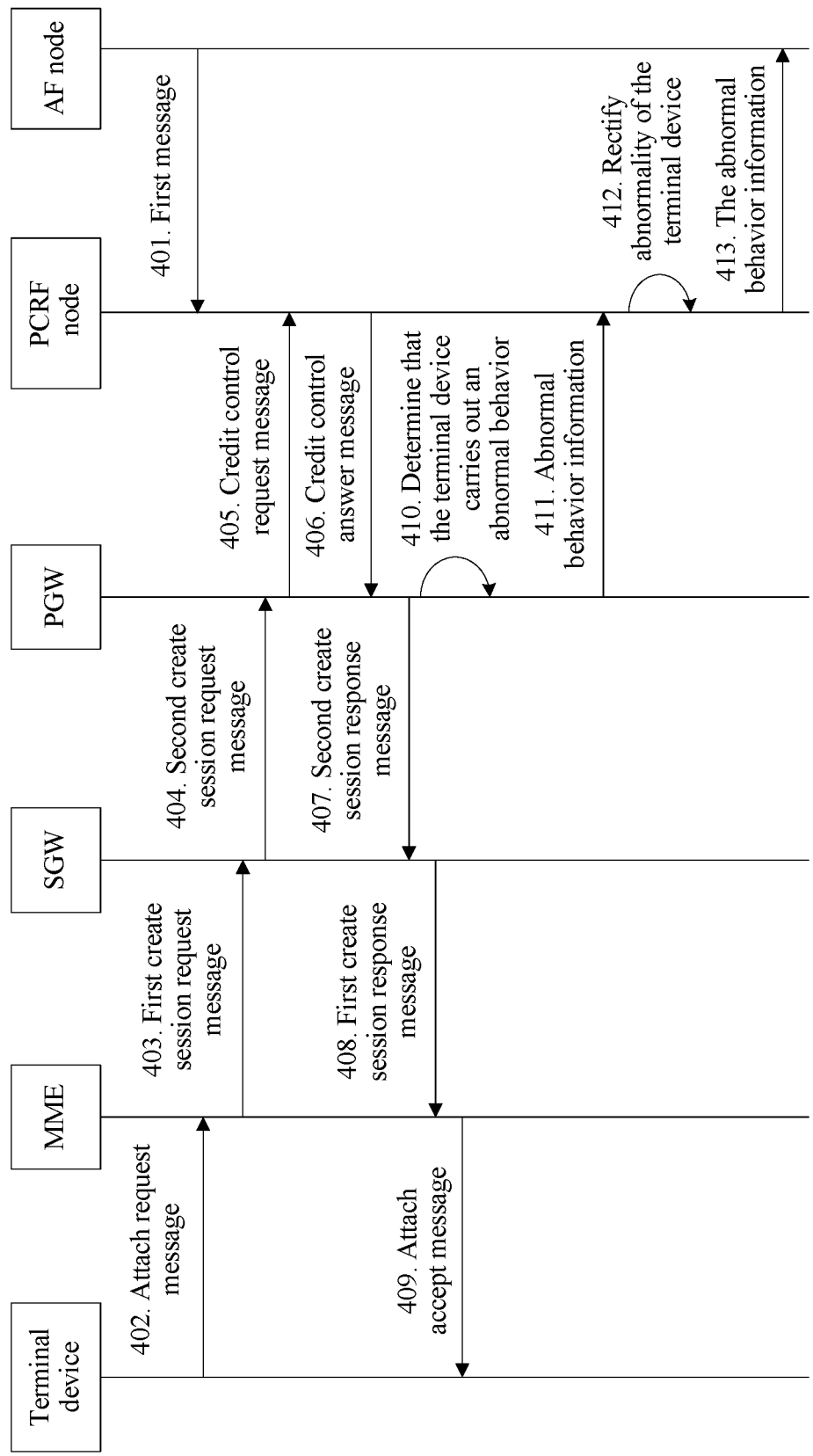
FIG. 4 is a flowchart of a third embodiment of a method for detecting a terminal device anomaly according to the present invention.

FIG. 4 is a flowchart of a third embodiment of a method for detecting a terminal device anomaly according to the present invention. As shown in FIG. 4, the method in this embodiment may include the following steps.

Step 401: An AF node sends a first message to a PCRF node, where the first message includes an identifier of a group to which a terminal device belongs, and abnormal event triggering information corresponding to the identifier of the group to which the terminal device belongs.

The abnormal event triggering information includes at least one of the following: an abnormal event triggering condition for the terminal device or configuration information regarding an abnormal event trigger.

It should be noted that the abnormal event triggering information corresponding to the identifier of the group to which the terminal device belongs should be considered as abnormal event triggering information of each terminal device that belongs to the group.

Optionally, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol (IP) address of the terminal device is or is not a preset IP address.

The AF node is an application function entity, and the AF node may be configured to provide dynamic information related to a user system. For example, the AF node may be a server in FIG. 1.

Optionally, after step 401, the method may further include: sending, by the PCRF node to the AF, an acknowledgment (ack) message corresponding to the first message.

It should be noted that step 401 is an optional manner in which the PCRF node obtains the abnormal event triggering information of the terminal device. Step 401 is an optional step. When step 401 is not performed, the PCRF node may obtain the abnormal event triggering information from local configuration information of the PCRF node. The local configuration information includes the abnormal event triggering information.

Step 402: The terminal device sends an attach request message to an MME.

Step 403: The MME sends a first create session request message to an SGW, where the first create session request message includes the identifier of the group to which the terminal device belongs.

It should be noted that before step 403, the MME may perform user authentication on the terminal device by interacting with an HSS, to obtain the identifier of the group from the HSS.

Step 404: The SGW sends a second create session request message to a PGW, where the second create session request message includes the identifier of the group to which the terminal device belongs.

Step 405: The PGW sends a credit control request (CCR) message to the PCRF node, where the CCR message includes the identifier of the group to which the terminal device belongs.

Step 406: The PCRF node determines, according to the identifier of the group to which the terminal device belongs, the abnormal event triggering information of the terminal device, and returns a credit control answer (CCA) message to the PGW, where the CCA message includes the abnormal event triggering information of the terminal device.

Optionally, the PGW may also determine the abnormal event triggering information from the local configuration information of the PGW, and the local configuration information of the PGW includes the abnormal event triggering information. In this case, the CCA message in step 406 may not include the abnormal event triggering information of the terminal device.

It should be noted that when the abnormal event triggering condition for the terminal device that is obtained by the PCRF node includes a fully qualified domain name (FQDN) identifier, before step 406, the method may further include: the PCRF node interacts with a domain name system (DNS) server to obtain an Internet Protocol (IP) address corresponding to the FQDN identifier; and the PCRF node replaces the FQDN identifier in the abnormal event triggering condition with the IP address corresponding to the FQDN identifier. Correspondingly, the abnormal event triggering condition in the abnormal event triggering information included in the CCA message is an abnormal event triggering condition for the terminal device after replacement.

Step 407: The PGW returns a second create session response message to the SGW.

It should be noted that the second create session response message is an answer message for the second create session request message.

Step 408: The SGW returns a first create session response message to the MME.

It should be noted that the first create session response message is an answer message for the first create session request message.

Step 409: The MME returns an attach accept message to the terminal device according to the first create session response message.

It should be noted that after step 409 is performed, an attachment process of the terminal device ends, that is, the terminal device has been attached to a network in which the PGW is located.

Step 410: The PGW determines, according to the abnormal event triggering information of the terminal device, that an anomaly has occurred in the terminal device.

For example, when the abnormal event triggering condition for the terminal device is that the destination address of the data sent by the terminal device is the preset address, that the PGW determines, according to the abnormal event triggering information of the terminal device, that an anomaly has occurred in the terminal device may include:

determining, by the PGW, whether the destination address of the data sent by the terminal device is the preset address; and if the destination address is the preset address, determining that the destination address of the data sent by the terminal device is abnormal (that the destination address of the data sent by the terminal device is abnormal may be considered as an anomaly).

For example, when the abnormal event triggering condition for the terminal device is that the access technology of the terminal device is not the preset technology, that the PGW determines, according to the abnormal event triggering information of the terminal device, that an anomaly has occurred in the terminal device may include:

determining, by the PGW, whether the access technology of the terminal device is the preset technology; and if the access technology is not the preset technology, determining that the access technology of the terminal device is abnormal (that the access technology of the terminal device is abnormal may be considered as an anomaly).

The access technology may be, for example, Wireless Fidelity (WIFI), Worldwide Interoperability for Microwave Access (WIMAX), or Code Division Multiple Access (CDMA).

Step 411: The PGW sends anomaly information regarding the terminal device to the PCRF node.

Optionally, the PGW may perform step 411 after determining the anomaly information regarding the terminal device in step 410 (in this case, the PGW may send the anomaly information regarding the terminal device to the PCRF node by using the CCR message); or the PGW may periodically perform step 411 (in this case, the PGW may send the anomaly information regarding the terminal device to the PCRF node by using the CCR message); or the PGW may perform step 411 after receiving the anomaly obtaining request from the PCRF (in this case, the PGW may send the anomaly information regarding the terminal device to the PCRF node by using the anomaly obtaining response corresponding to the anomaly obtaining request).

Step 412: The PCRF node rectifies anomaly of the terminal device.

Specifically, the PCRF node reduces quality of service (QoS) for the terminal device, or terminates an IP-connectivity access network (CAN) session of the terminal device.

It should be noted that step 412 is an optional step.

Step 413: The PCRF node sends the anomaly information regarding the terminal device to the AF node.

It should be noted that step 413 is also an optional step, and there is no sequence between step 412 and step 413. When an administrator of the terminal device (such as an operator) needs to obtain the anomaly information regarding the terminal device from the PCRF node, step 413 may be not included; and when the administrator of the terminal device needs to obtain the anomaly information regarding the terminal device from the AF node, step 413 needs to be included.

In this embodiment, the PCRF node obtains the abnormal event triggering information of the terminal device before the terminal device initiates attachment; the PCRF node sends the abnormal event triggering information of the terminal device to the PGW in the attachment procedure of the terminal device; and the PGW determines, according to the abnormal event triggering information, that the anomaly has occurred in the terminal device, so that the PGW can determine the anomaly of the terminal device according to the abnormal event triggering information obtained from the PCRF node.

Figure 5:
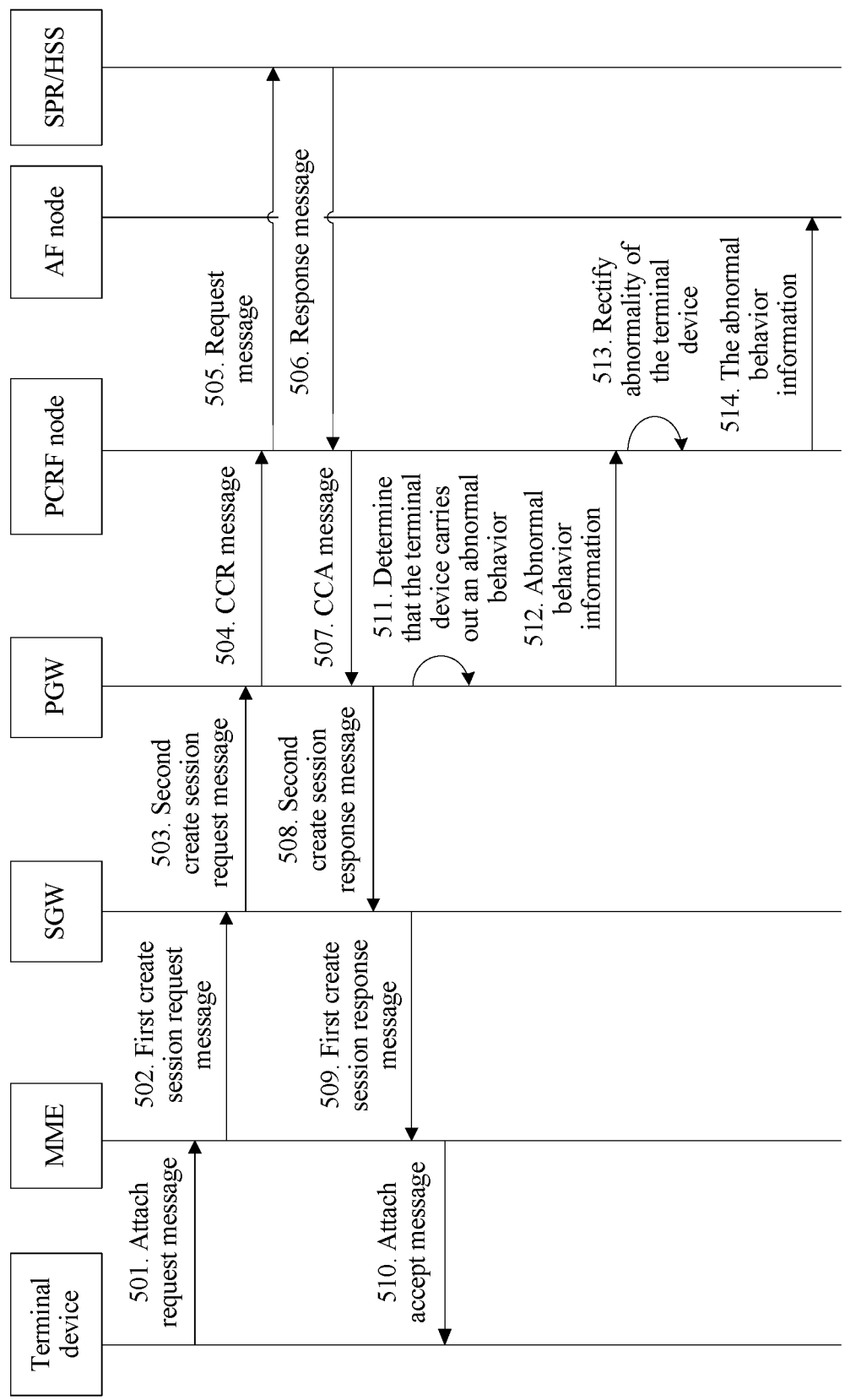
FIG. 5 is a flowchart of a fourth embodiment of a method for detecting a terminal device anomaly according to the present invention.

FIG. 5 is a flowchart of a fourth embodiment of a method for detecting a terminal device anomaly according to the present invention. As shown in FIG. 5, the method in this embodiment may include the following steps.

Step 501: A terminal device sends an attach request message to an MME.

Step 502: The MME sends a first create session request message to an SGW.

Step 503: The SGW sends a second create session request message to a PGW.

Step 504: The PGW sends a CCR message to a PCRF node.

It should be noted that steps 501 to 504 are similar to those in the prior art, and details are not described herein.

Step 505: The PCRF node sends a request message to an HSS/SPR, where request message is used for requesting subscription data of the terminal device, and the subscription data of the terminal device includes abnormal event triggering information of the terminal device.

Step 506: The HSS/SPR returns a response message to the PCRF node, where the response message includes the subscription data of the terminal device.

Step 507: The PCRF node returns a CCA message to the PGW, where the CCA message includes the abnormal event triggering information of the terminal device.

Step 508: The PGW returns a second create session response message to the SGW.

Step 509: The SGW returns a first create session response message to the MME.

Step 510: The MME returns an attach accept message to the terminal device according to the first create session response message.

Step 511: The PGW determines, according to the abnormal event triggering information of the terminal device, that an anomaly has occurred in the terminal device.

It should be noted that step 511 is similar to step 410, and details are not described herein again.

Step 512: The PGW sends anomaly information regarding the terminal device to the PCRF node.

It should be noted that step 512 is similar to step 411, and details are not described herein again.

Step 513: The PCRF node rectifies anomaly of the terminal device.

It should be noted that step 513 is an optional step, and step 513 is similar to step 412, and details are not described herein again.

Step 514: The PCRF node sends the anomaly information regarding the terminal device to the AF node.

It should be noted that step 514 is an optional step, and step 514 is similar to step 413, and details are not described herein again.

In this embodiment, the PCRF node obtains the abnormal event triggering information of the terminal device from the HSS/SPR in an attachment process of the terminal device; the PCRF node sends the abnormal event triggering information of the terminal device to the PGW in the attachment procedure of the terminal device; and the PGW determines, according to the abnormal event triggering information, that the anomaly has occurred in the terminal device, so that the PGW can determine the anomaly of the terminal device according to the abnormal event triggering information obtained from the PCRF node.

Figure 6:
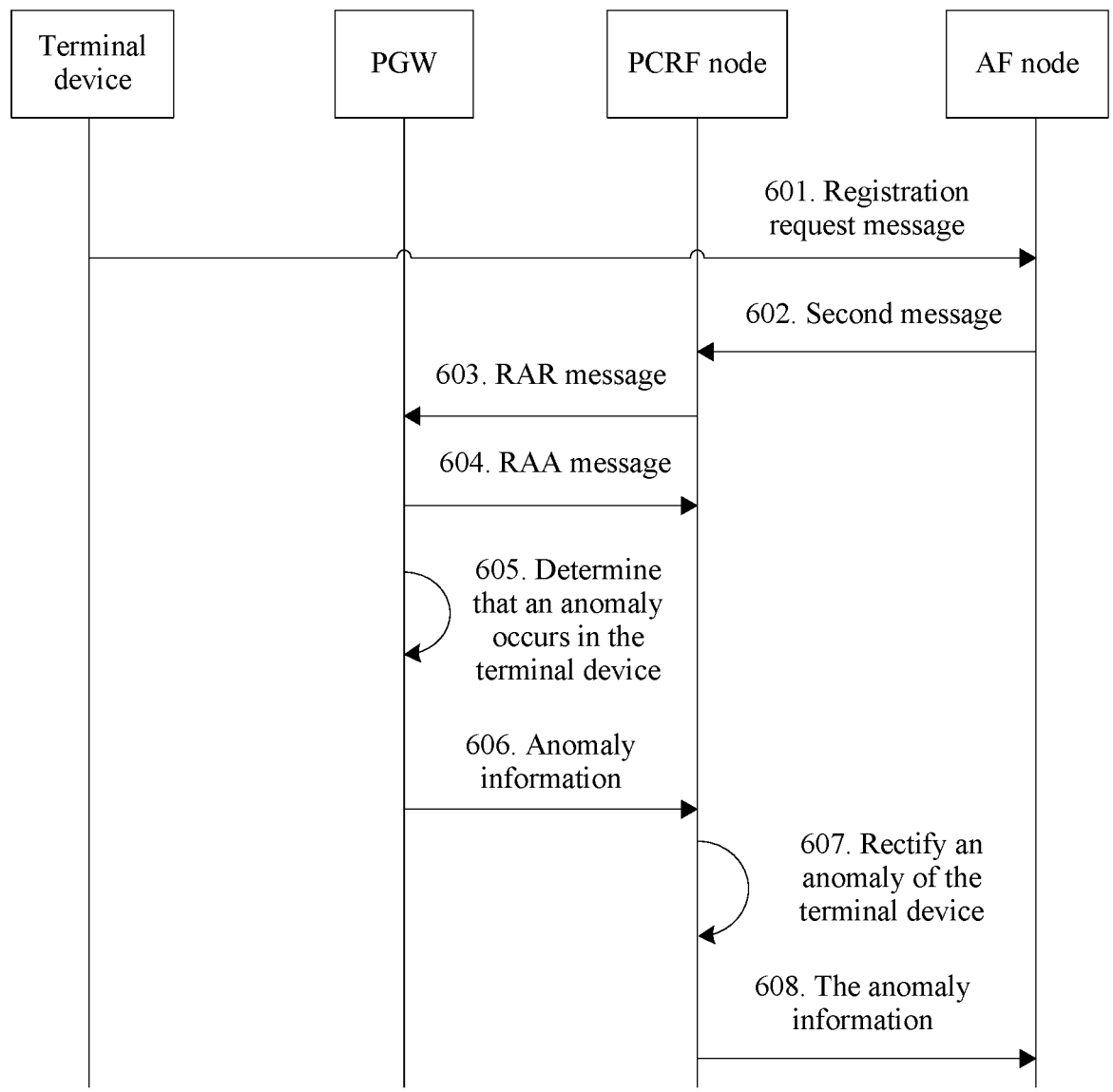
FIG. 6 is a flowchart of a fifth embodiment of a method for detecting a terminal device anomaly according to the present invention.

FIG. 6 is a flowchart of a fifth embodiment of a method for detecting a terminal device anomaly according to the present invention. As shown in FIG. 6, the method in this embodiment may include the following steps.

Step 601: A terminal device sends a registration request message to an AF node, where the registration request message includes an identifier of the terminal device.

Step 602: The AF node determines, according to the registration request message, abnormal event triggering information of the terminal device, and sends a second message to a PCRF node, where the second message includes the abnormal event triggering information of the terminal device and the identifier of the terminal device.

Optionally, after step 602, the method may further include: sending, by the PCRF node to the AF, an acknowledgment (ack) message corresponding to the second message.

Step 603: The PCRF node sends a re-auth-request (RAR) message to a PGW, where the RAR message includes an abnormal event triggering condition for the terminal device of the terminal device.

Step 604: The PGW returns, to the PCRF node, a re-auth-answer (RAA) message that is corresponding to the RAR message.

Step 605: The PGW determines, according to the abnormal event triggering information of the terminal device, that an anomaly has occurred in the terminal device.

It should be noted that step 605 is similar to step 410, and details are not described herein again.

Step 606: The PGW sends anomaly information regarding the terminal device to the PCRF node.

It should be noted that step 606 is similar to step 411, and details are not described herein again.

Step 607: The PCRF node rectifies anomaly of the terminal device.

It should be noted that step 607 is an optional step, and step 607 is similar to step 412, and details are not described herein again.

Step 608: The PCRF node sends the anomaly information regarding the terminal device to the AF node.

It should be noted that step 608 is an optional step, and step 608 is similar to step 413, and details are not described herein again.

In this embodiment, after the terminal device is attached to a network in which the PGW is located, the terminal device sends the registration request message to the AF node; the AF node sends the abnormal event triggering condition for the terminal device to the PCRF node; the PCRF node sends the abnormal event triggering information of the terminal device to the PGW; and the PGW determines, according to the abnormal event triggering information, that the anomaly has occurred in the terminal device, so that the PGW can determine the anomaly of the terminal device according to the abnormal event triggering information obtained from the PCRF node.

Figure 7:
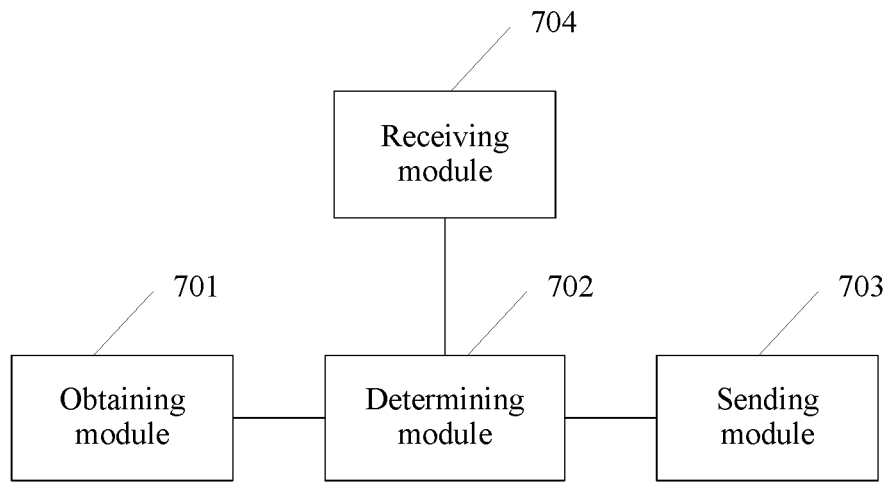
FIG. 7 is a schematic structural diagram of a first embodiment of an apparatus for detecting a terminal device anomaly according to the present invention.

FIG. 7 is a schematic structural diagram of a first embodiment of an apparatus for detecting a terminal device anomaly according to the present invention, and the apparatus is a PGW. As shown in FIG. 7, the apparatus in this embodiment may include an obtaining module 701 and a determining module 702. The obtaining module 701 is configured to obtain abnormal event triggering information regarding a terminal device is triggered, where the abnormal event triggering information includes at least one of the following: an abnormal event triggering condition for the terminal device or configuration information regarding an abnormal event trigger. The determining module 702 is configured to determine, according to the abnormal event triggering information, that an anomaly has occurred in the terminal device.

Optionally, the apparatus in this embodiment may further include a sending module 703, configured to send anomaly information regarding the terminal device to a network node, where the network node is a policy and charging rules function PCRF node or an application function AF node.

Optionally, the apparatus in this embodiment may further include a receiving module 704, configured to receive an anomaly obtaining request sent by the network node.

The sending module 703 is specifically configured to send an anomaly obtaining response to the network node, and the anomaly obtaining response includes the anomaly information regarding the terminal device.

Optionally, the obtaining module 701 is specifically configured to receive the abnormal event triggering information sent by the network node, and the network node is the PCRF node or the AF node.

Optionally, if the network node is the PCRF node, the obtaining module 701 is specifically configured to: receive a re-auth-request RAR message sent by the network node, where the RAR message includes the abnormal event triggering information; or receive a credit control answer CCA message sent by the network node, where the CCA message includes the abnormal event triggering information.

Optionally, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

The apparatus in this embodiment may be configured to perform the technical solution in the method embodiment shown in FIG. 2, and the technical solutions on a PGW side in the method embodiments shown in FIG. 4 to FIG. 6. Implementation principles and technical effects thereof are similar and details are not described herein.

Figure 8:
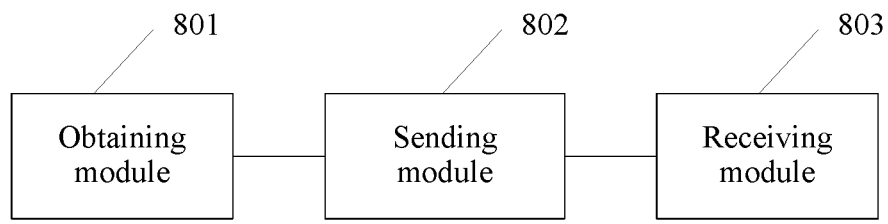
FIG. 8 is a schematic structural diagram of a second embodiment of an apparatus for detecting a terminal device anomaly according to the present invention.

FIG. 8 is a schematic structural diagram of a second embodiment of an apparatus for detecting a terminal device anomaly according to the present invention. As shown in FIG. 8, the apparatus in this embodiment may include an obtaining module 801 and a sending module 802. The obtaining module 801 is configured to obtain abnormal event triggering information indicating an abnormal event regarding a terminal device is triggered, and the abnormal event triggering information includes at least one of the following: an abnormal event triggering condition for the terminal device or configuration information regarding an abnormal event trigger. The sending module 802 is configured to send the abnormal event triggering information to a packet data network gateway PGW, and the abnormal event triggering information is used by the PGW to determine whether an anomaly has occurred in the terminal device.

Optionally, the network node is a policy and charging rules function PCRF node or an application function AF node.

Optionally, if the network node is the PCRF node, the obtaining module 801 is specifically configured to: receive the abnormal event triggering information sent by the AF node; or receive the abnormal event triggering information sent by a subscription profile repository SPR or a home subscriber server HSS.

Optionally, if the network node is the PCRF node, the obtaining module 801 is specifically configured to: send a re-auth-request RAR message to the PGW, where the RAR message includes the abnormal event triggering information; or send a credit control answer CCA message to the PGW, where the CCA message includes the abnormal event triggering information.

Optionally, the apparatus in this embodiment further includes a receiving module 803, configured to receive anomaly information regarding the terminal device that is sent by the PGW.

Optionally, the sending module 802 is further configured to send an anomaly obtaining request to the PGW.

Correspondingly, the receiving module 803 is specifically configured to receive an anomaly obtaining response sent by the PGW, and the anomaly obtaining response includes the anomaly information regarding the terminal device.

Optionally, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

The apparatus in this embodiment may be configured to perform the technical solution in the method embodiment shown in FIG. 3, and the technical solutions on a PCRF side and an AF side in the method embodiments shown in FIG. 4 to FIG. 6. Implementation principles and technical effects thereof are similar and details are not described herein.

The present invention further provides a system for detecting a terminal device anomaly, including the PGW according to the first embodiment of the apparatus for detecting a terminal device anomaly, and the network node according to the second embodiment of the apparatus for detecting a terminal device anomaly.

The system in this embodiment may be configured to perform the technical solutions in the method embodiments shown in FIG. 2 to FIG. 6. Implementation principles and technical effects thereof are similar and details are not described herein.

Figure 9:
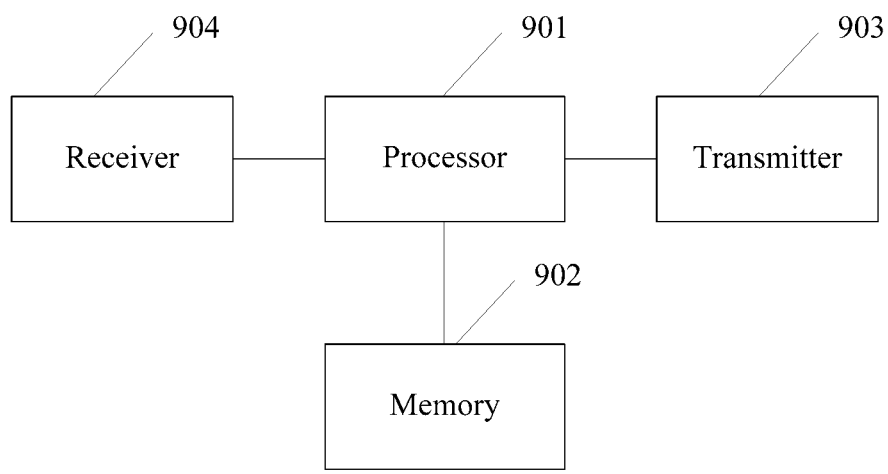
FIG. 9 is a schematic structural diagram of a third embodiment of an apparatus for detecting a terminal device anomaly according to the present invention.

FIG. 9 is a schematic structural diagram of a third embodiment of an apparatus for detecting a terminal device anomaly according to the present invention, and the apparatus is a PGW. As shown in FIG. 9, the apparatus in this embodiment may include a processor 901 and a memory 902. The apparatus may further include a transmitter 903 and a receiver 904. The transmitter 903 and the receiver 904 may be connected to the processor 901. The transmitter 903 is configured to send data or information, the receiver 904 is configured to receive the data or the information, and the memory 902 stores an execution instruction. When the apparatus runs, the processor 901 communicates with the memory 902, and the processor 901 invokes the execution instruction in the memory 902 to perform the following operations:

obtaining abnormal event triggering information indicating an abnormal event regarding a terminal device is triggered, where the abnormal event triggering information includes at least one of the following: an abnormal event triggering condition for the terminal device or configuration information regarding an abnormal event trigger; and determining, according to the abnormal event triggering information, that an anomaly has occurred in the terminal device.

Optionally, after the determining that an anomaly has occurred in the terminal device, the operations further include: sending anomaly information regarding the terminal device to a network node, where the network node is a policy and charging rules function PCRF node or an application function AF node.

Optionally, that the PGW sends the anomaly information regarding the terminal device to the network node includes:

receiving, by the PGW, an anomaly obtaining request sent by the network node; and sending, by the PGW, an anomaly obtaining response to the network node, where the anomaly obtaining response includes the anomaly information regarding the terminal device.

Optionally, that the PGW obtains the abnormal event triggering information of the terminal device includes:

receiving, by the PGW, the abnormal event triggering information sent by the network node, where the network node is the PCRF node or the AF node.

Optionally, if the network node is the PCRF node, the receiving, by the PGW, the abnormal event triggering information sent by the network node includes:

receiving, by the PGW, a re-auth-request RAR message sent by the network node, where the RAR message includes the abnormal event triggering information; or receiving, by the PGW, a credit control answer CCA message sent by the network node, where the CCA message includes the abnormal event triggering information.

Optionally, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

The apparatus in this embodiment may be configured to perform the technical solution in the method embodiment shown in FIG. 2, and the technical solutions on a PGW side in the method embodiments shown in FIG. 4 to FIG. 6. Implementation principles and technical effects thereof are similar and details are not described herein.

Figure 10:
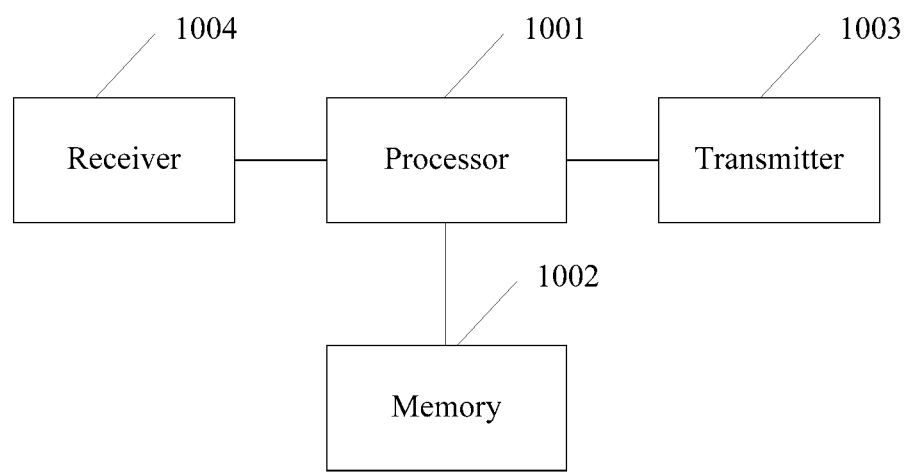
FIG. 10 is a schematic structural diagram of a fourth embodiment of an apparatus for detecting a terminal device anomaly according to the present invention.

FIG. 10 is a schematic structural diagram of a fourth embodiment of an apparatus for detecting a terminal device anomaly according to the present invention, and the apparatus is a network node. As shown in FIG. 10, the apparatus in this embodiment may include a processor 1001 and a memory 1002. The apparatus may further include a transmitter 1003 and a receiver 1004. The transmitter 1003 and the receiver 1004 may be connected to the processor 1001. The transmitter 1003 is configured to send data or information, the receiver 1004 is configured to receive the data or the information, and the memory 1002 stores an execution instruction. When the apparatus runs, the processor 1001 communicates with the memory 1002, and the processor 1001 invokes the execution instruction in the memory 1002 to perform the following operations:

obtaining abnormal event triggering information indicating an abnormal event regarding a terminal device is triggered, where the abnormal event triggering information includes at least one of the following: an abnormal event triggering condition for the terminal device or configuration information regarding an abnormal event trigger; and sending the abnormal event triggering information to a packet data network gateway PGW, where the abnormal event triggering information is used by the PGW to determine whether an anomaly has occurred in the terminal device.

Optionally, the network node is a policy and charging rules function PCRF node or an application function AF node.

Optionally, if the network node is the PCRF node, that the network node obtains the abnormal event triggering information of the terminal device includes:

receiving, by the network node, the abnormal event triggering information sent by the AF node, or receiving, by the network node, the abnormal event triggering information sent by a subscription profile repository SPR or a home subscriber server HSS.

Optionally, if the network node is the PCRF node, that the network node sends the abnormal event triggering information to the PGW includes:

sending, by the network node, a re-auth-request RAR message to the PGW, where the RAR message includes the abnormal event triggering information; or sending, by the network node, a credit control answer CCA message to the PGW, where the CCA message includes the abnormal event triggering information.

Optionally, after the sending the abnormal event triggering information to a PGW, the operations further include:

receiving, by the network node, anomaly information regarding the terminal device that is sent by the PGW.

Optionally, before the receiving, by the network node, the anomaly information regarding the terminal device that is sent by the PGW, the operations further include:

sending, by the network node, an anomaly obtaining request to the PGW; and the receiving, by the network node, anomaly information regarding the terminal device that is sent by the PGW includes:

receiving, by the network node, an anomaly obtaining response sent by the PGW, where the anomaly obtaining response includes the anomaly information regarding the terminal device.

Optionally, the abnormal event triggering condition for the terminal device includes at least one of the following:

a destination address of data sent by the terminal device is or is not a preset address;

moving frequency of the terminal device is greater than or less than preset frequency;

a bearer resource request behavior occurs or does not occur on the terminal device;

an access technology of the terminal device is or is not a preset technology;

a data rate of the terminal device is greater than or less than a preset rate;

a speed of the terminal device is greater than or less than a preset speed;

an acceleration of the terminal device is greater than or less than a preset acceleration; or an Internet Protocol IP address of the terminal device is or is not a preset IP address.

The apparatus in this embodiment may be configured to perform the technical solution in the method embodiment shown in FIG. 3, and the technical solutions on a PCRF side and an AF side in the method embodiments shown in FIG. 4 to FIG. 6. Implementation principles and technical effects thereof are similar and details are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for detecting a terminal device anomaly, comprising:
    obtaining, by a packet data network gateway (PGW), abnormal event triggering information indicating an abnormal event regarding the terminal device, wherein the abnormal event triggering information comprises at least one of the following:
    information indicating an abnormal event trigger condition for the terminal device or configuration information regarding an abnormal event trigger;
    determining, by the PGW according to the abnormal event triggering information, that an anomaly has occurred in the terminal device;
    sending, by the PGW, anomaly information regarding the terminal device to a network node,
    wherein the network node is a policy and charging rules function (PCRF) node or an application function (AF) node; and
    wherein when the network node configured is the AF node, the AF node sends the abnormal event trigger to the PCRF node for rectification of the terminal device along with an identifier of a group to which the terminal device belongs and abnormal event triggering information corresponding to the identifier of the group to which the terminal device belongs; and
    wherein when the network node configured is the PCRF node, the PCRF node obtains subscription data of the terminal device from subscription profile repository (SPR), wherein the subscription data includes e abnormal event triggering information and
    wherein the PCRF node rectifies the anomaly of the terminal device.

2. The method according to claim 1, wherein rectifying, by the PCRF node, the anomaly of the terminal device comprises:
    at least one of reducing, by the PCRF node, quality of service (QoS) for the terminal device, or terminating, by the PCRF node, an IP-connectivity access network (CAN) session of the terminal device.

3. The method according to claim 1, wherein the obtaining, by the PGW, the abnormal event triggering information indicating the abnormal event regarding the terminal device comprises:
    receiving, by the PGW, the abnormal event triggering information from the network node, wherein the network node is the PCRF node or the AF node.

4. The method according to claim 1, wherein the abnormal event triggering condition for the terminal device comprises at least one of the following:
    a destination address of data sent by the terminal device is or is not a preset address;
    a bearer resource request behavior occurs or does not occur on the terminal device;
    an access technology of the terminal device is or is not a preset technology;
    a speed of the terminal device is greater than or less than a preset speed;
    an acceleration of the terminal device is greater than or less than a preset acceleration; or
    an Internet Protocol (IP) address of the terminal device is or is not a preset IP address.

5. A method for detecting a terminal device anomaly, comprising:
    obtaining, by a network node, abnormal event triggering information indicating an abnormal event regarding the terminal device, wherein the network node is a policy and charging rules function (PCRF) node or an application function (AF) node, wherein the abnormal event triggering information comprises at least one of the following:
    information indicating an abnormal event trigger condition for the terminal device or configuration information regarding an abnormal event trigger;
    sending, by the network node, the abnormal event triggering information to a packet data network gateway (PGW), wherein the abnormal event triggering information is used by the PGW to determine whether an anomaly has occurred in the terminal device; and
    sending, by the PGW, anomaly information regarding the terminal device to a network node,
    wherein the network node is a policy and charging rules function (PCRF) node or an application function (AF) node; and
    wherein when the network node configured is the AF node, the AF node sends the abnormal event trigger to the PCRF node for rectification of the terminal device along with an identifier of a group to which the terminal device belongs and abnormal event triggering information corresponding to the identifier of the group to which the terminal device belongs; and
    wherein when the network node configured is the PCRF node, the PCRF node obtains subscription data of the terminal device from subscription profile repository (SPR), wherein the subscription data includes the abnormal event triggering information and
    wherein the PCRF node rectifies the anomaly of the terminal device.

6. The method according to claim 5, wherein rectifying, by the PCRF node, the anomaly of the terminal device comprises:
    at least one of reducing, by the PCRF node, quality of service (QoS) for the terminal device, or terminating, by the PCRF node, an IP-connectivity access network (CAN) session of the terminal device.

7. The method according to claim 5, wherein the network node is the PCRF node, the obtaining, by the network node, the abnormal event triggering information indicating the abnormal event regarding the terminal device is triggered comprises:
  receiving, by the network node, the abnormal event triggering information from an AF node; or
  receiving, by the network node, the abnormal event triggering information from a subscription profile repository (SPR) or a home subscriber server (HSS).

8. The method according to claim 5, wherein the network node is the PCRF node; and, wherein sending, by the network node, the abnormal event triggering information to the PGW comprises:
  sending, by the network node, a re-auth-request (RAR) message to the PGW, wherein the RAR message comprises the abnormal event triggering information; or
  sending, by the network node, a credit control answer (CCA) message to the PGW, wherein the CCA message comprises the abnormal event triggering information.

9. The method according to claim 5, wherein the method further comprises:
  receiving, by the network node, anomaly information regarding the terminal device from the PGW.

10. The method according to claim 5, wherein the abnormal event triggering condition for the terminal device comprises at least one of the following:
  a destination address of data sent by the terminal device is or is not a preset address;
  a bearer resource request behavior occurs or does not occur on the terminal device;
  an access technology of the terminal device is or is not a preset technology;
  a speed of the terminal device is greater than or less than a preset speed;
  an acceleration of the terminal device is greater than or less than a preset acceleration; or
  an Internet Protocol (IP) address of the terminal device is or is not a preset IP address.

11. An apparatus of a packet data network gateway (PGW) for detecting a terminal device anomaly, wherein the apparatus comprises: a processor and a memory, the processor being configured to communicate with the memory, and to invoke execution instructions in the memory to perform the following operations:
  obtaining abnormal event triggering information indicating an abnormal event regarding a terminal device, wherein the abnormal event triggering information comprises at least one of the following:
  information indicating an abnormal event trigger condition for the terminal device or configuration information regarding an abnormal event trigger;
  determining, according to the abnormal event triggering information that an anomaly has occurred in the terminal device;
  sending anomaly information regarding the terminal device to a network node, wherein the network node is a policy and charging rules function (PCRF) node or an application function (AF) node; and
  when the network node is the PCRF node, rectifying, by the PCRF node, the anomaly of the terminal device;
  sending, by the PGW, anomaly information regarding the terminal device to a network node, wherein the network node is a policy and charging rules function (PCRF) node or an application function (AF) node; and
  wherein when the network node configured is the AF node, the AF node sends the abnormal event trigger to the PCRF node for rectification of the terminal device, along with an identifier of a group to which the terminal device belongs and abnormal event triggering information corresponding to the identifier of the group to which the terminal device belongs; and
  wherein when the network node configured is the PCRF node, the PCRF node obtains subscription data of the terminal device from subscription profile repository (SPR), wherein the subscription data includes the abnormal event triggering information and wherein the PCRF node rectifies the anomaly of the terminal device.

12. The apparatus according to claim 11, wherein rectifying, by the PCRF node, the anomaly of the terminal device comprises:
  at least one of reducing, by the PCRF node, quality of service (QoS) for the terminal device, or terminating, by the PCRF node, an IP-connectivity access network (CAN) session of the terminal device.

13. The apparatus according to claim 11, wherein obtaining the abnormal event triggering information regarding the terminal device comprises:
  receiving the abnormal event triggering information from the network node, and the network node is the PCRF node or the AF node.

14. The apparatus according to claim 13, wherein a network node is the PCRF node, the receiving the abnormal event triggering information from the network node includes:
  receiving a re-auth-request (RAR) message from the network node, wherein the RAR message comprises the abnormal event triggering information; or receiving a credit control answer (CCA) message from the network node, wherein the CCA message comprises the abnormal event triggering information.

15. The apparatus according to claim 11, wherein the abnormal event triggering condition for the terminal device comprises at least one of the following:
  a destination address of data sent by the terminal device is or is not a preset address;
  a bearer resource request behavior occurs or does not occur on the terminal device;
  an access technology of the terminal device is or is not a preset technology;
  a speed of the terminal device is greater than or less than a preset speed;
  an acceleration of the terminal device is greater than or less than a preset acceleration; or
  an Internet Protocol (IP) address of the terminal device is or is not a preset IP address.

16. An apparatus of a network node for detecting, a terminal device anomaly, wherein the network node is a policy and charging rules function (PCRF) node or an application function (AF) node, wherein the apparatus comprises a processor and a memory, the processor being configured to communicate with the memory, and to invoke execution instructions in the memory to perform the following operations:
  obtaining abnormal event triggering information indicating an abnormal event regarding a terminal device, wherein the abnormal event triggering information comprises at least one of the following:
  an abnormal event triggering condition for the terminal device or configuration information regarding an abnormal event trigger;
  sending the abnormal event triggering information to a packet data network gateway (PGW), wherein the abnormal event triggering information is used by the PGW to determine whether an anomaly has occurred in the terminal device; and sending anomaly information regarding the terminal device to a network node, wherein the network node is a policy and charging rules function (PCRF) node or an application function (AF) node; and when the network node is the PCRF node, rectifying by the PCRF node, the anomaly of the terminal device;

sending, by the PGW, anomaly information regarding the terminal device to a network node, wherein the network node is a policy and charging rules function (PCRF) node or an application function (AF) node; and wherein when the network node configured is the AF node, the AF node sends the abnormal event trigger to the PCRF node for rectification of the terminal device, along with an identifier of a group to which the terminal device belongs and abnormal event triggering information corresponding to the identifier of the group to which the terminal device belongs; and wherein when the network node configured is the PCRF node, the PCRF node obtains subscription data of the terminal device from subscription profile repository (SPR), wherein the subscription data includes the abnormal event triggering information and wherein the PCRF node rectifies the anomaly of the terminal device.

17. The apparatus according to claim 16, wherein rectifying, by the PCRF node, the anomaly of the terminal device comprises:
at least one of reducing, by the PCRF node, quality of service (QoS) for the terminal device, or terminating, by the PCRF node, an IP-connectivity access network (CAN) session of the terminal device.

18. The apparatus according to claim 16, wherein the network node is the PCRF node, obtaining the abnormal event triggering information indicating the abnormal event regarding the terminal device is triggered comprises:
receiving the abnormal event triggering information from the AF node; or receiving the abnormal event triggering information from a subscription profile repository (SPR) or a home subscriber server HSS; or,
wherein the network node is the PCRF node, the sending the abnormal event triggering information to the PGW comprises: sending a re-auth-request (RAR) message to the PGW, wherein the RAR message comprises the abnormal event triggering information; or sending a credit control answer (CCA) message to the PGW, wherein the CCA message comprises the abnormal event triggering information.

19. The apparatus according to claim 16, wherein the processor is configured to invoke execution instructions to further perform:
receiving anomaly information regarding the terminal device from the PGW.

20. The apparatus according to claim 16, wherein the abnormal event triggering condition for the terminal device comprises at least one of the following:
a destination address of data sent by the terminal device is or is not a preset address;
a bearer resource request behavior occurs or does not occur on the terminal device;
an access technology of the terminal device is or is not a preset technology;
a speed of the terminal device is greater than or less than a preset speed;

an acceleration of the terminal device is greater than or less than a preset acceleration; or
an Internet Protocol (IP) address of the terminal device is or is not a preset IP address.

21. The method according to claim 1, wherein the method further comprises:
sending, by the AF node, a first message to the PCRF node, wherein the first message includes an identifier of a group to which the terminal device belongs and the abnormal event triggering information corresponding to the identifier of the group to which the terminal device belongs;
sending, by the terminal device, an attach request message to a mobility management entity (MME);
sending, by the MME, a first create session request message to a serving gateway (SGW), wherein the first create session request message includes the identifier of the group to which the terminal device belongs;
sending, by the SGW, a second create session request message to the PGW, wherein the second create session request message includes the identifier of the group to which the terminal device belongs;
sending, by the PGW, a credit control request (CCR) message to the PCRF node, wherein the CCR message includes the identifier of the group to which the terminal device belongs;
determining, by the PCRF node, according to the identifier of the group to which the terminal device belongs, the abnormal event triggering information of the terminal device, and returning a credit control answer (CCA) message to the PGW, wherein the CCA message includes the abnormal event triggering information of the terminal device;
returning, by the PGW, a second create session response message to the SGW;
returning, by the SGW, a first create session response message to the MME;
returning, by the MME, an attach accept message to the terminal device according to the first create session response message;
determining, by the PGW, according to the abnormal event triggering information of the terminal device, that the anomaly has occurred in the terminal device; and
sending, by the PGW, the anomaly information regarding the terminal device to the PCRF node.

22. The method according to claim 1, wherein the method further comprises:
sending, by the terminal device, an attach request message to a mobility management entity (MME);
sending, by the MME, a first create session request message to a serving gateway (SGW);
sending, by the SGW, a second create session request message to the PGW;
sending, by the PGW, a credit control request (CCR) message to the PCRF node;
sending, by the PCRF node, a request message to a subscription profile repository (SPR) or a home subscriber server (HSS), wherein request message is used for requesting subscription data of the terminal device, and the subscription data of the terminal device includes abnormal event triggering information of the terminal device;
returning, by the HSS or the SPR, a response message to the PCRF node, wherein the response message includes the subscription data of the terminal device;

returning, by the PCRF node, a credit control answer (CCA) message to the PGW, wherein the CCA message includes the abnormal event triggering information of the terminal device;

returning, by the PGW, a second create session response message to the SGW;

returning, by the SGW, a first create session response message to the MME;

returning, by the MME, an attach accept message to the terminal device according to the first create session response message;

determining, by the PGW, according to the abnormal event triggering information of the terminal device, that the anomaly has occurred in the terminal device; and sending, by the PGW, the anomaly information regarding the terminal device to the PCRF node.

23. The method according to claim 1, wherein the method further comprises:

sending, by the terminal device, a registration request message to the AF node, wherein the registration request message includes an identifier of the terminal device;

determining, by the AF node, according to the registration request message, the abnormal event triggering information of the terminal device, and sending a second message to the PCRF node, wherein the second message includes the abnormal event triggering information of the terminal device and the identifier of the terminal device;

sending, by the PCRF node, a re-auth-request (RAR) message to the PGW, wherein the RAR message includes an abnormal event triggering condition for the terminal device of the terminal device;

returning, by the PGW, to the PCRF node, a re-auth-answer (RAA) message that is corresponding to the RAR message;

determining, by the PGW, according to the abnormal event triggering information of the terminal device, that the anomaly has occurred in the terminal device; and sending, by the PGW, the anomaly information regarding the terminal device to the PCRF node.

* * * * *